United States Patent [19]
Plattner

[11] 3,747,529
[45] July 24, 1973

[54] ELECTROMAGNETIC GENERATOR FOR A RIFLED PROJECTILE

[75] Inventor: Pierre Plattner, Oberglatt, Switzerland

[73] Assignee: Werkzeugmaschinenfabrik Oerlikon-Buhrle AG, Zurich, Switzerland

[22] Filed: May 25, 1972

[21] Appl. No.: 256,815

[30] Foreign Application Priority Data
June 3, 1971 Switzerland.......................... 8110/71

[52] U.S. Cl. ............................ 102/70.2 GA, 310/67
[51] Int. Cl. .............................................. F42c 11/04
[58] Field of Search...................... 310/67, 156, 152, 310/90; 102/70.2, 70.2 G, 70.2 GA

[56] References Cited
UNITED STATES PATENTS

| | | | |
|---|---|---|---|
| 3,388,273 | 6/1968 | Davis | 310/67 R |
| 3,125,027 | 3/1964 | Stoller | 102/70.2 G |
| 2,511,872 | 6/1950 | Parker | 102/70.2 G |
| 3,596,122 | 7/1971 | Stewart | 310/67 |

Primary Examiner—D. F. Duggan
Attorney—Werner W. Kleeman

[57] ABSTRACT

An electromagnetic generator for a rifled projectile comprising an armature coil and a field magnet defining a pair of generator components. There is also provided a fuse housing in which both generator components are arranged within one another and rotatable relative to one another, the outer one of both generator components being rotatably mounted in the fuse housing and the inner one of both generator components being secured to the fuse housing.

3 Claims, 2 Drawing Figures

PATENTED JUL 24 1973 3,747,529

3,747,529

ELECTROMAGNETIC GENERATOR FOR A RIFLED PROJECTILE

BACKGROUND OF THE INVENTION

The present invention relates to a new and improved electromagnetic generator for a rifled projectile having an armature coil and a field magnet, wherein both generator components are arranged within one another and rotatable relative to one another in a fuse housing.

Now with a prior art electromagnetic generator of this type for a rifled projectile, the armature coil is arranged at the axis of the ignition or detonator device and bears via a ball-bearing against the floor of the fuse housing. The field magnets are fixedly connected with the fuse housing. During firing of the rifled projectile the armature coil does not essentially participate in the spiral or spin motion owing to its inertia, whereas on the other hand the field magnets rotate in accordance with the spin of the projectile. In this way there is generated at the armature coil which can be employed for igniting an explosive charge. With heretofore known electromagnetic generators the removal or tapping-off of the current takes place at the armature coil via brushes. As a result, there is present a certain amount of friction, by means of which the armature coil is likewise driven, especially because its moment of inertia is relatively small. Notwithstanding the low moment of inertia, in order to be able to insure that the armature coil remains stationary relative to the rotating field magnets, the armature coil is connected with the tip of the projectile and the projectile tip is likewise rotatably mounted at the fuse housing and equipped with vanes impinged by air so that a braking action opposing the spin is generated upon the tip of the projectile and the armature coil. Hence with the heretofore known electromagnetic generators, it should be apparent that relatively complicated constructional measures are required in order to insure for a sufficiently high relative rotational speed between the armature coil and the field magnet so as to be able to obtain sufficient current generation.

SUMMARY OF THE INVENTION

Hence, from what has been discussed above, it should be apparent that this particular field of technology is still in need of electromagnetic generators for rifled projectiles which are not associated with the aforementioned drawbacks and limitations of the heretofore proposed constructions. Therefore it is a primary object of the present invention to provide a new and improved construction of electromagnetic generator for rifled projectiles which is not associated with the aforementioned drawbacks and limitations of the heretofore known constructions of the prior art and effectively and reliably fulfills the existing need in the art.

Another and more specific object of the present invention relates to a new and improved construction of electromagnetic generator of the previously mentioned type for a rifled projectile which is constructed such that a sufficiently great relative rotational speed between the armature coil and the field magnet can be realized with relatively simple means.

Now in order to implement these and still further objects of the invention, which will become more readily apparent as the description proceeds, the invention is manifested by the features that the outer one of both generator components is rotatably mounted at the fuse housing and the inner one of both generator components is secured to the fuse housing.

Owing to the inventive measures, the moment of inertia of the component of the electromagnetic generator which remains in its rest state during the generation of spin is considerably increased. Moreover, since the armature coil rotates with the fuse housing, it is additionally possible to tap-off the generated current without the need of brushes. Advantageously, the field magnet is constructed as a ring-shaped permanent magnet. Its mounting can occur through the agency of a plate-shaped retaining or holding body which bears at the direct region of the axis of the projectile upon the fuse housing during the firing acceleration.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
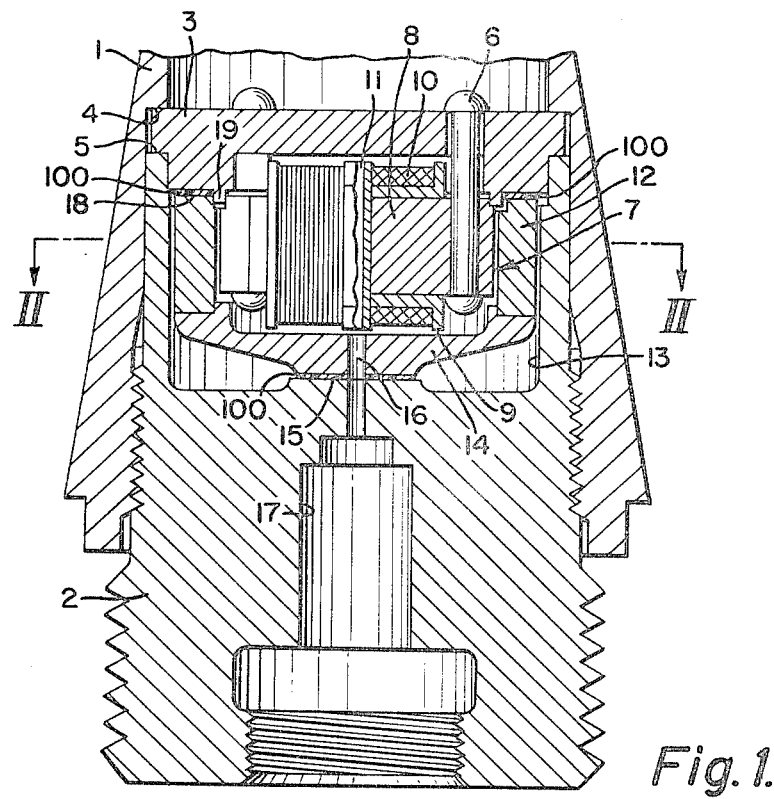
FIG. 1 is an axial sectional view through a rifled projectile equipped with electromagnetic generator means.
Figure 2:
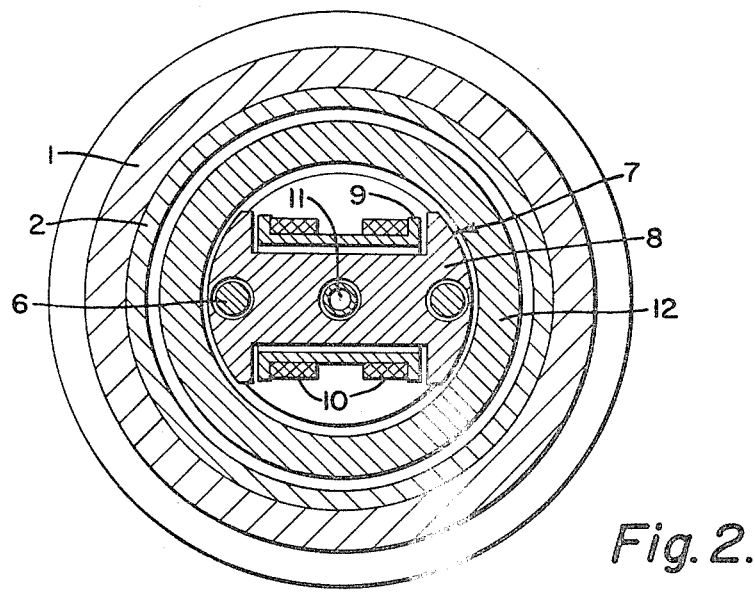
FIG. 2 is a cross-sectional view of the arrangement of FIG. 1, taken substantially along the line II—II thereof.

Describing now the drawing, a fuse housing 2 is threaded from the rear into a hollow projectile tip 1. In the threaded-fuse housing 2 a switching plate or sheet bar 3 is fixedly clamped between a rear ring-shaped shoulder 4 at the projectile tip 1 and a front ring-shaped shoulder 5 of the fuse housing 2. An armature coil 7 is secured through the agency of two rivets 6 with the switching plate 3. As best seen by referring to FIG. 2, the armature coil 7 possesses a double-pole armature 8 with salient poles. Two windings 10 are arranged upon the armature 8 while interposing therebetween a coil body 9.

Continuing, it will be understood that the armature 8 additionally possesses a central bore 11. A ring-shaped likewise double-pole field magnet 12 surrounds the armature coil 7. The field magnet 12 and the armature coil 7 are arranged at a central recess or chamber 13 of the fuse housing 2. Whereas the armature coil 7 is supported by the switching plate 3 and extends to the rear into the recess 13, the field magnet 12 bears towards the rear through the agency of a plate-shaped holding or retaining body 14 against the base of the recess 13 at the region of the projectile lengthwise axis. The field magnet 12 is drawn onto the holding body 14. The ring-shaped field magnet 12 bears with its inner surface against the outside of a ring-shaped shoulder 19 of the switching plate 3 and is thus centered. A ring-shaped surface 18 of the switching plate which is situated opposite a front end face of the field magnet 12 serves as an impact surface for the field magnet 12 during projectile retardation or deceleration. During projectile acceleration the holding body 14 carrying the field magnet 12 bears with its floor or base surface at a raised bearing surface 15 which protrudes past the base of the recess or chamber 13.

The surfaces 18, 19 of the switching plate 3 and the field magnet 12 which come into contact with one another as well as the holding body 14 and the fuse housing 2 at the region of the bearing surface 15 are provided with a respective Teflon layer, generally indicated at 100, for the purpose of reducing friction. The holding body 14 possesses a central bore 16 which continues towards the rear in the form of a stepped bore 17 which widens in diameter in a step-like fashion and is provided at the fuse housing 2. The stepped bore 17 houses a non-illustrated explosive capsule which can be connected via electrical lines in the respective aligned bores 17, 16 and 11 of the fuse housing 2, the holding body 14 and the armature 8, for instance can be connected to a likewise non-illustrated electrical capacitor. The capacitor is located upon the switching plate 3 and is charged through the agency of intermediately connected rectifier means by the current produced in the windings 10 of the armature coil 7 during firing of the projectile.

The maximum current is produced at the armature coil 7 during the acceleration phase of the projectile when owing to the large moment of inertia and the favorable mounting of the field magnet 12 practically the entire projectile spin occurs in the form of a relative rotational speed of movement between the armature coil and the field magnet. During braking or deceleration of the projectile at its flight path, the field magnet 12 comes to bear against the ring-shaped surface 18 so that the frictional moment is enlarged and the relative rotational speed between the armature coil and the field magnet is reduced. At this period of time, however, the capacitor has already been charged and the electrical energy remains stored for use.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. An electromagnetic generator for a rifled projectile, comprising an armature coil and a field magnet defining a pair of generator components, a fuse housing at which both of such generator components are arranged within one another and rotatable relative to one another, means for rotatably mounting the outer of both generator components at the fuse housing and means for securing the inner of both generator components to the fuse housing, the outer of both generator components being said field magnet which is mounted to be rotatable in the fuse housing and the inner of both generator components being the armature coil which is secured to the fuse housing, said field magnet being constructed as a substantially ring-shaped magnet, said rotatably mounting means comprising a substantially plate-shaped holding body at which is centered and secured said field magnet, means defining bearing means, said plate-shaped holding body bearing through the agency of said bearing means at the region of the lengthwise axis of the projectile at the fuse housing during projectile acceleration.

2. An electromagnetic generator for a rifled projectile, comprising an armature coil and a field magnet defining a pair of generator components, a fuse housing at which both of such generator components are arranged within one another and rotatable relative to one another, means for rotatably mounting the outer of both generator components at the fuse housing and means for securing the inner of both generator components to the fuse housing, the outer of both generator components being said field magnet which is mounted to be rotatable in the fuse housing and the inner of both generator components being the armature coil which is secured to the fuse housing, said securing means incorporating a switching plate secured in the fuse housing, said armature coil being secured to said switching plate, said switching plate possessing a substantially ring-shaped surface centering the field magnet and a friction surface acting as a counterbearing surface for the field magnet during braking of the projectile.

3. The electromagnetic generator as defined in claim 2, wherein said rotatably mounting means comprises a substantially plate-shaped holding body for centering and securing the field magnet, means defining bearing means, said holding body bearing via said bearing means at the region of the projectile axis at the fuse housing during projectile acceleration, and wherein the bearing- and centering surfaces are provided with Teflon.

* * * * *